United States Patent [19]

Sticha et al.

[11] Patent Number: 5,349,584
[45] Date of Patent: Sep. 20, 1994

[54] METHOD OF MAINTAINING CONTROL IN A TRUNKED COMMUNICATION SYSTEM

[75] Inventors: David A. Sticha, Marengo; Glenn N. Mayer, Elgin; Stephen J. Ranz, Elmhurst; John Garbarino, Streamwood, all of Ill.

[73] Assignee: Motorola, Inc., Schaumburg, Ill.

[21] Appl. No.: 114,799

[22] Filed: Aug. 30, 1993

[51] Int. Cl.$^5$ .............................................. H04B 3/36
[52] U.S. Cl. .................... 370/97; 340/425.1; 455/9; 455/11.1; 455/67.1
[58] Field of Search ............... 370/13.1, 16, 17, 97, 370/85.1, 85.2, 85.4; 455/8, 9, 11.1, 13.1, 16, 53.1, 56.1, 54.1, 54.2, 17, 34.1, 34.2, 67.1, 33.1, 49.1; 371/7, 8.1, 8.2, 11.1, 11.2, 12, 14, 4; 340/425.1, 825.03, 825.06, 825.16, 825.04

[56] References Cited

U.S. PATENT DOCUMENTS 4,903,321  2/1990  Hall et al. ............................... 455/8
5,117,501  5/1992  Childress et al. ..................... 655/11.1

Primary Examiner—Douglas W. Olms
Assistant Examiner—Huy D. Vu
Attorney, Agent, or Firm—Susan L. Lukasik; Steven G. Parmelee; Wayne G. Egan

[57] ABSTRACT

A master repeater controls a trunked communication system having a number of communication resources. The master repeater determines (201) how many communication resources are available to the master repeater. When one control resource and one message resource are among the available communication resources (203), the master repeater suspends (211) trunked communication system operation when the number of available communication resources are less than a minimum number of resources (205), and the available communication resources fail to include all control resources (207) from the trunked communication system. When one control resource and one message resource are among the available communication resources (203), the master repeater provides (209) trunked communication system operation when the number of available communication resources are equal to or greater than a minimum number of resources (205), or the available communication resources include all control resources (207) from the trunked communication system.

14 Claims, 2 Drawing Sheets

METHOD OF MAINTAINING CONTROL IN A TRUNKED COMMUNICATION SYSTEM

FIELD OF THE INVENTION

This invention relates to trunked communications, including but not limited to control of trunked communications operations.

BACKGROUND OF THE INVENTION

Trunked communication systems are known to comprise a plurality of communication units, a limited number of communication resources that are transceived via a predetermined number of repeaters, or base stations, and a communication resource allocator that allocates the limited number of communication resources among the plurality of communication units. The communication units may be portable radios and/or mobile radios. The communication resources may comprise a TDM (time-division multiplexed) bus, a carrier frequency, a pair of carrier frequencies, or any RF (radio frequency) transmission means.

In many systems, the communication resource allocator for each coverage area is a distributed infrastructure connected to each of the repeaters via a local area network. One repeater is designated as an active resource controller, also called an active master repeater or a master repeater, which allocates communications resources for all communication requests in the coverage area via the local area network, thereby providing control for the trunked communication system. Although typically only one repeater maintains this function for a coverage area, two or more, perhaps even all, repeaters in each coverage area are capable of performing as the master repeater, in case a repeater becomes inoperative or some other reason. When the active master repeater becomes inoperative, the remaining repeaters choose a new active master repeater, and communications continue.

If the local area network develops a break, thus separating the master repeater from any number of repeaters, the separated repeaters choose a new master repeater, thus two active master repeaters and hence two systems exist for the same coverage area for the same group of users. Two or more such systems can cause turmoil in resource allocation, such as both master repeaters allocating the same frequency or time slot to different users at the same time, or allocating different resources to the same user for one call. Other difficulties arise when a group call must be established, as some units from a group may be assigned to one system, and other units from the same group may be assigned to the other system, resulting in group members missing group calls. Many other undesirable communication trouble may result when a single system splits into two separate systems. Clearly, this situation must be avoided.

Accordingly, there is a need for a method of reestablishing singular control of the available resources in a communication system at all times.

DESCRIPTION OF A PREFERRED EMBODIMENT

Figure 1:
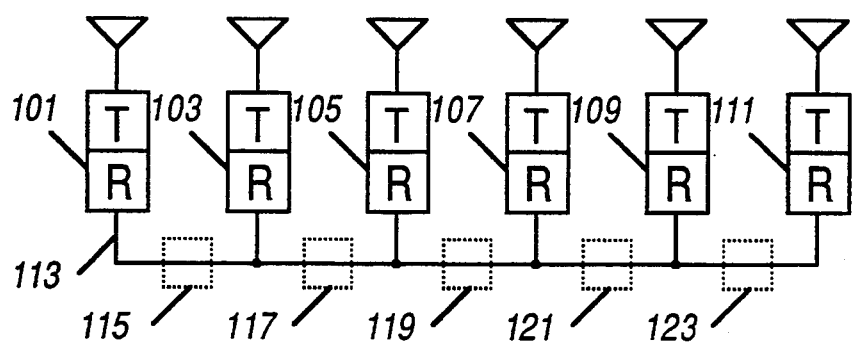
FIG. 1 is a block diagram of a trunked communication system in accordance with the invention.

The following describes method of determining whether a master repeater should continue trunking operations or suspend trunking operations based on analysis of the number and type of resources that are currently available for allocation by the master repeater.

One embodiment comprises a method of maintaining control of a trunked communication system by a master repeater. The master repeater determines how many communication resources are available to it, thereby providing a number of available communication resources.

When at least one control resource and at least one message resource are among the available communication resources, the master repeater suspends trunked communication system operation when the number of available communication resources are less than a minimum number of resources, the available communication resources fail to include all control resources from the trunked communication system, and the available communication resources fail to be sourced by all master capable repeaters from the trunked communication system. Alternatively, if all repeaters in the system are master capable repeaters, then when at least one control resource and at least one message resource are among the available communication resources, the master repeater suspends trunked communication system operation when the number of available communication resources are less than a minimum number of resources and the available communication resources fail to include all control resources from the trunked communication system.

When at least one control resource and at least one message resource are among the available communication resources, the master repeater provides trunked communication system operation when the number of available communication resources are equal to or greater than a minimum number of resources, the available communication resources include all control resources from the trunked communication system, or the available communication resources are sourced by all master capable repeaters from the trunked communication system. Alternatively, if all repeaters in the system are master capable repeaters, then when at least one control resource and at least one message resource are among the available communication resources, the master repeater provides trunked communication system operation when the number of available communication resources are equal to or greater than a minimum number of resources or the available communication resources include all control resources from the trunked communication system.

In addition, the master repeater suspends trunked communication system operation when the available communication resources fail to include at least one control resource and at least one message resource. When the trunked communication system has two or more master repeaters, each of the master repeaters performs the aforementioned tests, such that at most one master repeater provides control for the trunked communication system.

When the number of communication resources in the trunked communication system is an even number, one resource is designated as a token resource. The minimum number of resources is specified as one half of the total number of resources when one of the available communication resources is the token resource. The minimum number of resources is specified as one half of the total number of resources plus one when the available communication resources fail to include the token resource.

A plurality of repeaters 101, 103, 105, 107, 109, and 111 in a coverage area of a trunked communication system is shown in FIG. 1. Although the present invention may be applied to any number of repeaters for a coverage area, only six repeaters are shown for simplicity of the drawings and descriptions that follow. Each repeater, such as a Motorola IntelliRepeater available from Motorola, Inc., includes an interface to a local area network (network) 113, which distributes communication resource control information between the repeaters 101, 103, 105, 107, 109, and 111.

In the preferred embodiment, one repeater provides one communication resource at a given time. Alternatively, a single repeater may provide multiple resources at a given time, such as TDM resources, without loss of success of the present invention. In the preferred embodiment, a communication resource may be a control resource or a message resource at a given time. In the preferred embodiment, a message resource refers to a resource that may be used to source voice information or data information in a message, but a message resource is not a control resource or a control channel. A single repeater is the master repeater for each coverage area, and the master repeater may also source either a control resource or a message resource. In the preferred embodiment, any repeater is master capable, i.e., capable of functioning as a master repeater, which is an active resource controller that allocates communication resources within the coverage area by sending control messages through the network 113.

The network 113 may experience one or more breaks 115, 117, 119, 121, and 123 in communications, which breaks may be a split of a physical wire, a failure of an RF transmitter, continuous noise interference, and so forth. If, for example, the first repeater 101 is the master repeater in FIG. 1, a break 115, 117,119, 121, or 123 may occur anywhere along the network, separating any number of repeaters 103, 105, 107, 109, and 111 from the master repeater 101.

Figure 2:
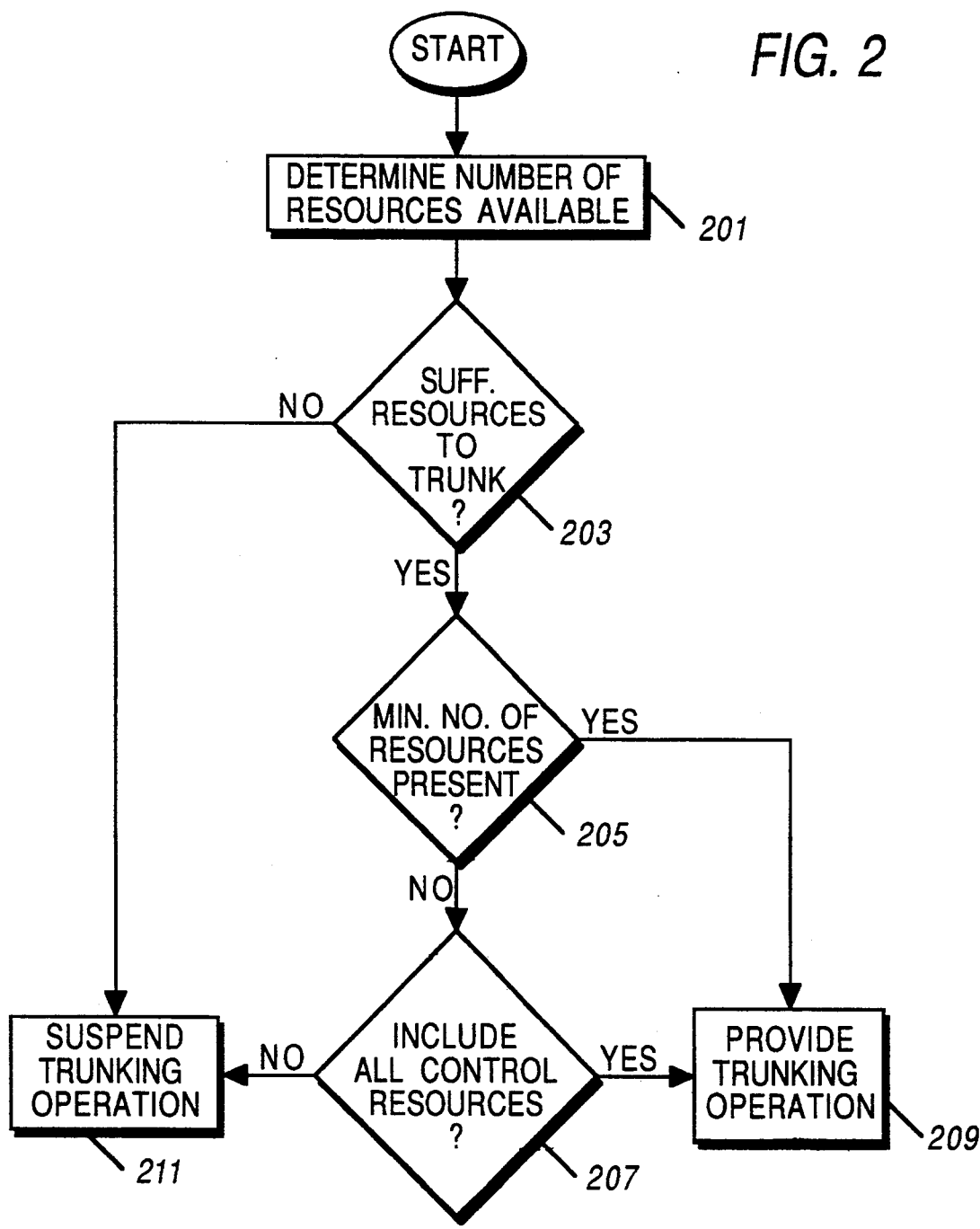
FIG. 2 is a flowchart showing master repeater control decisions when all repeaters are master capable in accordance with the invention.
Figure 3:
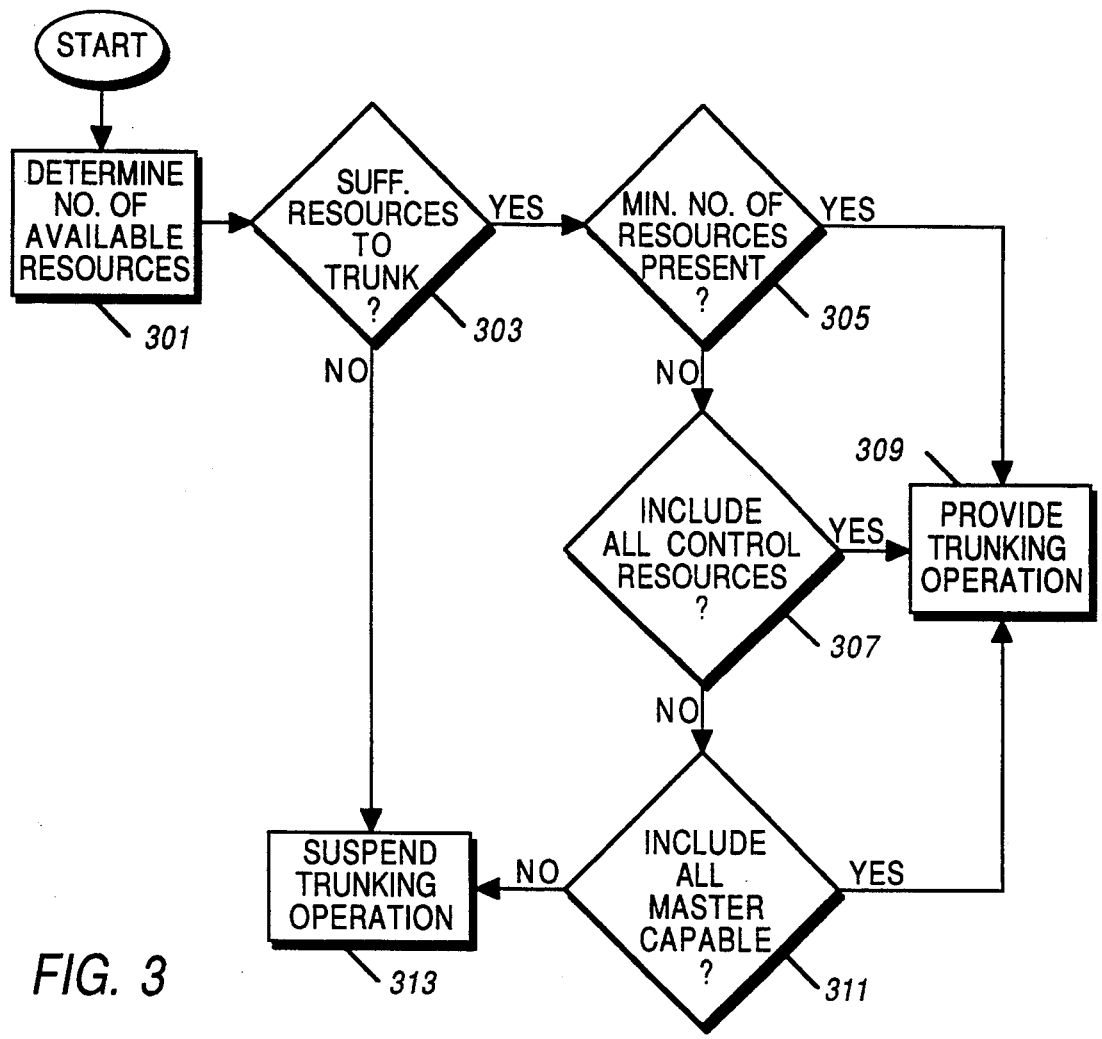
FIG. 3 is a flowchart showing master repeater control decisions when all repeaters are not master capable in accordance with the invention.

If, for example, a complete break 119 occurs in the middle of the network 113 between two repeaters 105 and 107. The result is two sections of repeaters, a first section containing three repeaters 101, 103, and 105 and a second section containing three repeaters 107, 109, and 111. Because the master repeater 101 only controls the first section, there is no active master repeater for the second section of the network containing the second three repeaters 107,109 and 111. In this instance, the second three repeaters 107, 109, and 111 of the second section choose a new active master repeater, e.g., repeater 107, resulting in two active master repeaters controlling two sets of resources in the same coverage area, effectively creating two systems. Because it is desirable to only have one system controlling the particular coverage area, it is necessary that each master repeater determine which repeater will control this coverage area. Such a determination is further complicated in that the two master repeaters 101 and 107 cannot communicate because of the break 119 in the network 113. Hence, each master repeater 101 and 107 must individually determine whether it is best suited to maintain trunking operations for the coverage area or whether it should shut down. The algorithm of FIG. 2 or FIG. 3 is performed by each master repeater whenever any change in a repeater status takes place, such as a new repeater, a removed repeater, a malfunctioning repeater, a repeater status change, a change in the master repeater, or a site state change. Once each master repeater performs the appropriate (FIG. 2 or FIG. 3) algorithm, the result is that at most one master repeater provides control of the allocation of communication resources for the coverage area.

When all repeaters at the site for the coverage area are master capable, the master repeater makes control decisions according to the flowchart shown in FIG. 2. The master repeater determines the number of resources available to it at step 201. This step includes determining how many control resources, how many message resources, and how many total resources are available for allocation by the master repeater. In the preferred embodiment, because each repeater only sources one communication resource, the number of total resources is the same as the number of repeaters with which the master repeater can communicate.

At step 203, the master repeater determines if there are sufficient resources to provide trunk communications in the system. To have sufficient resources requires that at least one message channel and at least control channel be currently available for allocation by the master repeater. The master may source the message channel or the master source the control channel, but each resource may be considered only as a message resource or a control resource, and may not be considered as both when only one repeater is available to the master repeater. If sufficient resources are not available to trunk at step 203, then trunking operation is suspended by the master repeater at step 211 until a system change occurs that causes the master repeater to provide trunking operations.

If there are sufficient resources available to the master repeater to trunk at step 203, then the process continues at step 205, where the master repeater determines if a minimum number of resources are currently available to it. The minimum number of resources is determined according to the algorithm shown in the flowchart of FIG. 4. If a minimum number of resources is present and available to the master repeater at step 205, then trunking operation for the coverage area is provided by the master repeater.

If the minimum number of resources is not present at step 205, then the process continues with step 207, where the master repeater determines if the available resources from step 201 include all the control resources that exist in the coverage area. If all the control resources are available to the master repeater, then any other part of the system, if there is another part, cannot possibly trunk because it has no control resource, hence, this master repeater and its available resources must provide trunked operation at step 209. If all the control resources are not provided at step 207, then trunking operation is suspended at 211, because this particular master repeater does not have sufficient resources to trunk, it does not have the minimum number of resources necessary to trunk, and it does not include all the control resources, hence, it is more likely that another system fragment, if in existence, is most likely to be able to provide the best possible trunked system operation for this coverage area.

When all repeaters at the site for the coverage area are not master capable, the master repeater makes control decisions according to the flowchart shown in FIG. 3. Step 301 is performed in the same way as step 201 of FIG. 2, step 303 is performed in the same way as step 203 of FIG. 2, and step 305 is performed according to the flowchart of FIG. 4. Step 307 is performed in the same way as step 207, except that if all the control resources that exist in the coverage area are not among the available resources as determined in step 301, then the process continues with step 311. At step 311, the master repeater determines if all of the master capable repeaters that exist in the coverage area are available to the master repeater. If all of the master capable repeaters are available to the master repeater at step 311, then the master repeater must provide trunking operation for the trunked system at step 309. Such operation must be provided in this instance because any other fragment of the system that may exist does not include a master capable repeater, and hence any such fragment is completely incapable of providing trunked communication operations because nothing is available to allocate any available communication resources. If all of the master capable repeaters are not available to the master repeater at step 311, then the process continues with step 313, where the master repeater suspends trunking operation, because this master repeater does not have the minimum number of resources necessary to trunk, it does not include all of the control resources nor does it include all of the master capable resources and, hence, it is not likely that this fragment will provide successful communications for this coverage area.

Figure 4:
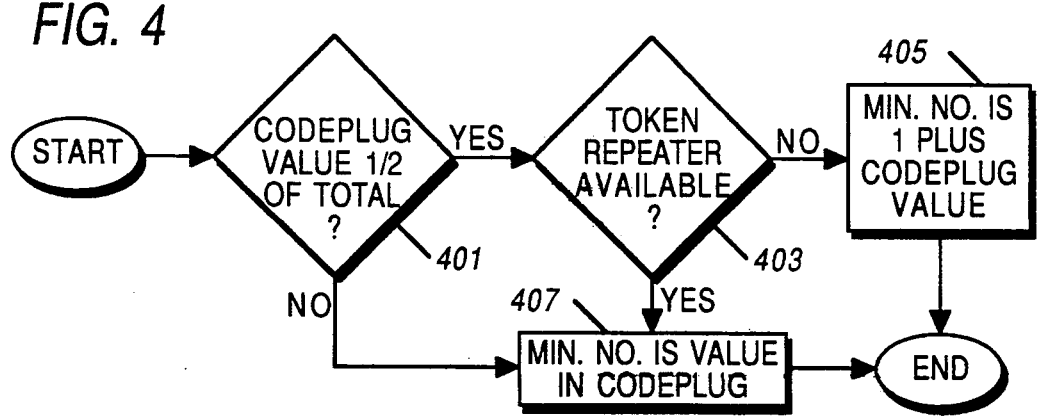
FIG. 4 is a flowchart showing determination of the minimum number of resources necessary to trunk in accordance with the invention.

Determination of the minimum number of resources necessary to trunk is shown in FIG. 4, which determination is called for in step 205 of FIG. 2 and step 305 of FIG. 3. When each master capable repeater is installed into a system, a predetermined value is stored in the master capable repeater's codeplug that represents the minimum number of resources that must be available to the master repeater for determining if the master repeater should provide trunked operation at the site at which it resides. The optimum number to store in the codeplug is half the total number of system resources rounded up to the nearest integer. Nevertheless, a system designer may also store a smaller number such as two, which effectively disables this feature. The system designer could also select a higher number if other factors make a trunking system of that size desirable.

At step 401, the master repeater determines if the minimum number (MIN. NO.) of resources necessary for trunked operations as stored in the master repeater's codeplug is equal to one half the total number of site resources. If the minimum number is not one half, the process continues with step 407. If the minimum number is one half, the process continues with step 403, where the master repeater determines if one of the available resources contains a repeater designated as a token repeater. Prior to each system installation, one repeater at each site is designated as a token repeater in case an even number of repeaters results in the coverage area. Thus, if at step 403 the token repeater is available to the master repeater, the process continues with step 407. At step 407, the minimum number of resources is considered to be the value stored in the master repeater's codeplug. If the token repeater is not among the available resources available to the master repeater at step 403, then the minimum number of resources is one plus the value stored in the master repeater's codeplug at step 405.

If the number of available resources as determined in step 201 or step 301 is greater than or equal to the minimum number of resources as found in steps 407 or 409, then the minimum number of resources is available to this master repeater and the answer to the question of step 205 or step 305 is yes. If the number of available resources as determined in step 201 or step 301 is less than the minimum number of resources as found in steps 407 or 409, then the minimum number of resources is not available to this master repeater and the answer to the question of step 205 or step 305 is no.

The present invention provides an improvement such that a communication system can survive multiple failures in both equipment and communications lines without the danger of the system splitting into two or more separate systems, thereby preventing undetectable communications failures.

What is claimed is:

1. A method of maintaining control by a master repeater of a trunked communication system having a number of communication resources, wherein the number of communication resources includes one or more control resources and one or more message resources, comprising the steps of:
   (A) determining how many communication resources, from among the number of communication resources are available to the master repeater, providing a number of available communication resources;
   (B) when at least one control resource and at least one message resource are among the available communication resources, suspending trunked communication system operation when:
      (a) the number of available communication resources are less than a minimum number of resources; and
      (b) the available communication resources fail to include all control resources from the trunked communication system;
   (C) when at least one control resource and at least one message resource are among the available communication resources, providing trunked communication system operation when one of the following is true:
      (a) the number of available communication resources are equal to or greater than a minimum number of resources; and
      (b) the available communication resources include all control resources from the trunked communication system.

2. The method of claim 1, further including the step of (D) suspending trunked communication system operation when the available communication resources fail to include at least one control resource and at least one message resource.

3. The method of claim 2, wherein the trunked communication system has at least two master repeaters, and each of the at least two master repeaters performs steps (A) through (D), such that at most one of the at least two master repeaters provides control for the trunked communication system.

4. The method of claim 1, wherein the number of communication resources in the trunked communication system comprises an even number, further comprising the steps of:

designating one resource as a token resource;

specifying as the minimum number of resources a predetermined value when one of the available communication resources is the token resource; and specifying as the minimum number of resources the predetermined value plus one when the available communication resources fail to include the token resource.

5. The method of claim 1, wherein one repeater provides one communication resource at a given time.

6. A method of maintaining control by a master repeater of a trunked communication system having a number of communication resources, wherein the number of communication resources includes one or more control resources and one or more message resources, comprising the steps of:

(A) determining how many communication resources, from among the number of communication resources, are available to the master repeater, providing a number of available communication resources;

(B) when at least one control resource and at least one message resource are among the available communication resources, suspending trunked communication system operation when:
 (a) the number of available communication resources are less than a minimum number of resources;
 (b) the available communication resources fail to include all control resources from the trunked communication system; and
 (c) the available communication resources fail to be sourced by all master capable repeaters from the trunked communication system (C) when at least one control resource and at least one message resource are among the available communication resources, providing trunked communication system operation when one of the following is true:
 (a) the number of available communication resources are equal to or greater than a minimum number of resources;
 (b) the available communication resources include all control resources from the trunked communication system; and
 (c) the available communication resources are sourced by all master capable repeaters from the trunked communication system.

7. The method of claim 6, further including the step of (D) suspending trunked communication system operation when the available communication resources fail to include at least one control resource and at least one message resource.

8. The method of claim 7, wherein the trunked communication system has at least two master repeaters, and each of the at least two master repeaters performs steps (A) through (D), such that at most one of the at least two master repeaters provides control for the trunked communication system.

9. The method of claim 6, wherein the number of communication resources in the trunked communication system comprises an even number, further comprising the steps of:

designating one resource as a token resource;

specifying as the minimum number of resources a predetermined value when one of the available communication resources is the token resource; and specifying as the minimum number of resources the predetermined value plus one when the available communication resources fail to include the token resource.

10. The method of claim 6, wherein one repeater provides one communication resource at a given time.

11. A method of maintaining control, by a master repeater, of a trunked communication system having a number of communication resources, wherein the number of communication resources includes one or more control resources and one or more message resources, comprising the steps of:

(A) determining how many communication resources, from among the number of communication resources, are available to the master repeater, and providing a number of available communication resources;

(B) suspending trunked communication system operation when the available communication resources fail to include at least one control resource and at least one message resource;

(C) when at least one control resource and at least one message resource are among the available communication resources, a suspending trunked communication system operation when:
 (a) the number of available communication resources are less than a minimum number of resources;
 (b) the available communication resources fail to include all control resources from the trunked communication system; and
 (c) the available communication resources fail to be sourced by all master capable repeaters from the trunked communication system.

(D) when at least one control resource and at least one message resource are among the available communication resources, providing trunked communication system operation when one of the following is true:
 (a) the number of available communication resources are equal to or greater than a minimum number of resources;
 (b) the available communication resources include all control resources from the trunked communication system; and
 (c) the available communication resources are sourced by all master capable repeaters from the trunked communication system.

12. The method of claim 11, wherein the trunked communication system has at least two master repeaters, and each of the at least two master repeaters performs steps (A) through (D), such that at most one of the at least two master repeaters provides control for the trunked communication system.

13. The method of claim 11, wherein the number of communication resources in the trunked communication system comprises an even number, further comprising the steps of:

designating one resource as a token resource;

specifying as the minimum number of resources a predetermined value when one of the available communication resources is the token resource; and specifying as the minimum number of resources the predetermined value plus one when the available communication resources fail to include the token resource.

14. The method of claim 11, wherein one repeater provides one communication resource at a given time.

* * * * *